UNITED STATES PATENT OFFICE.

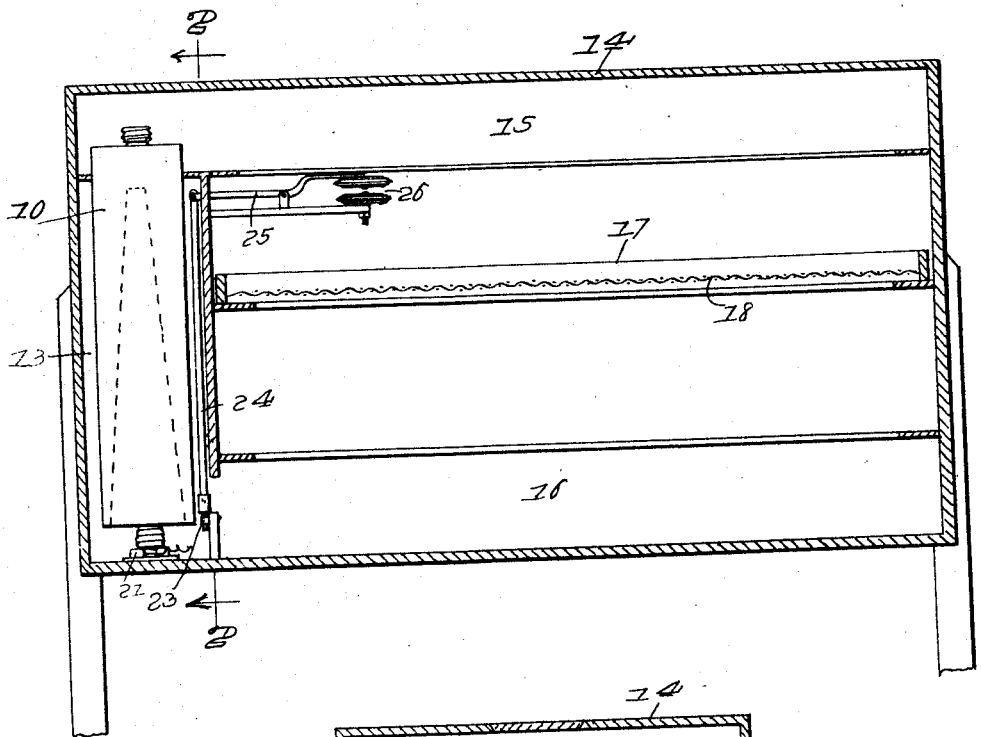
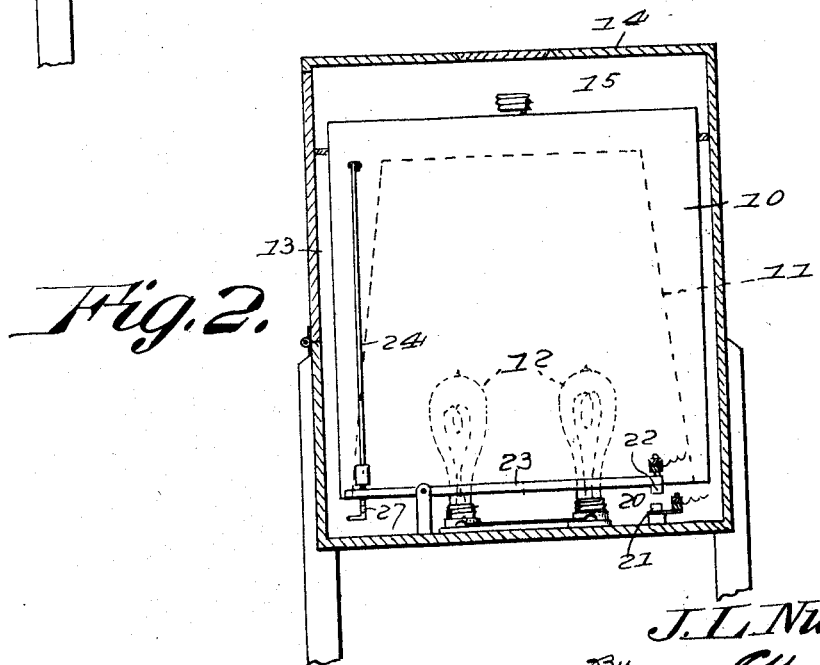

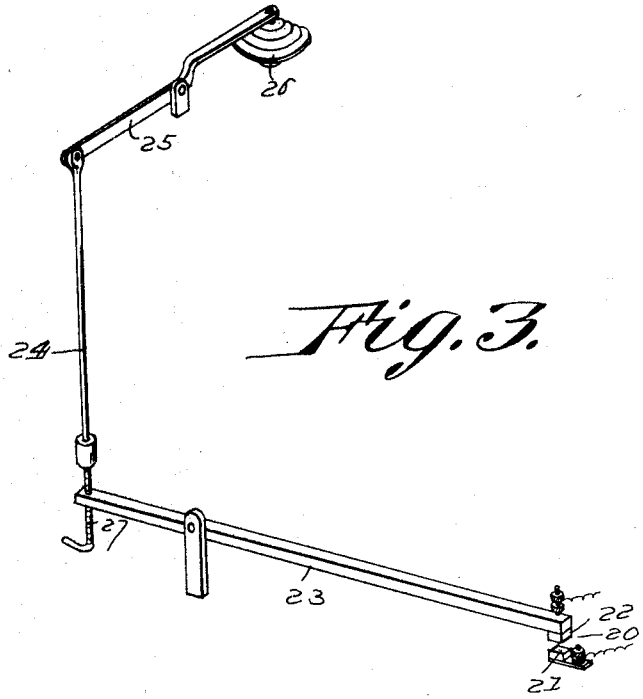
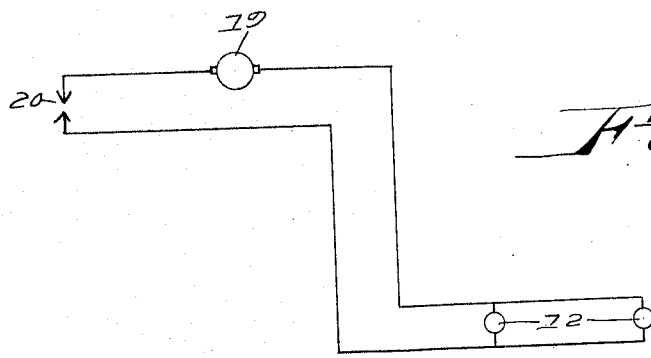

JAMES L. NUNGESTER, OF POCATELLO, IDAHO, ASSIGNOR TO NUNGESTER HOT WATER ELECTRIC INCUBATOR COMPANY, A CORPORATION OF IDAHO.

HOT-WATER ELECTRIC INCUBATOR.

1,385,886.  Specification of Letters Patent.  Patented July 26, 1921.

Application filed January 3, 1920. Serial No. 349,230.

*To all whom it may concern:*

Be it known that JAMES L. NUNGESTER, a citizen of the United States of America, residing at Pocatello, in the county of Bannock and State of Idaho, has invented new and useful Improvements in Hot-Water Electric Incubators, of which the following is a specification.

The object of the invention is to provide an incubator with an improved heating apparatus designed to secure a more uniform and efficient temperature within the egg chamber, the necessary adjustments from time to time as to suit changes in the outside temperature being accomplished automatically and through the operation and under the control of the thermostat, the mechanism being such as to provide for the use as a primary heating agency of an electric light bulb or bulbs or an electric coil or equivalent unit, and with these objects in view the invention consists in a construction and combination of parts of which a preferred embodiment is shown in the accompanying drawings, wherein:

Figure 1 is a side view of the heating apparatus applied in the operative position to an incubator of which the casing is shown in section.

Fig. 2 is a transverse vertical sectional view on the plane indicated by the line 2—2 of Fig. 1.

Fig. 3 is a detail view in perspective of the thermostatically controlled regulator and circuit closer.

Fig. 4 is a diagrammatic view illustrating the wiring.

While the apparatus embodying the essential features of the invention is shown in connection with a poultry incubator it will be understood that it is applicable with corresponding advantages to other types of incubators and to brooders and other inclosures wherein it is necessary or desirable to maintain a uniform temperature and avoid abrupt changes such as those which are incident, for example, to the forms of heating devices wherein the rise of temperature beyond a certain prescribed limit results in the complete elimination of the effect of the heating apparatus until such time as the temperature falls below a certain prescribed limit whereupon the heating apparatus is again restored to operative position, so that there is throughout the period of incubation a more or less objectionable variation of temperatures between prescribed limits rather than an even or substantially uniform temperature throughout, and to the end that a close approximation to an absolutely uniform temperature may be attained it is preferred to employ in connection with the heating apparatus an equalizing or heat distributing member shown in the drawing as consisting of a boiler 10 adapted to contain water or other liquid and arranged with its walls to inclose a heat chamber 11 within which the heating unit 12 consisting as shown, of the incandescent light bulbs of which any desired number may be employed, said equalizing or heat distributing unit or medium being disposed in a circulating passage 13 arranged for example, at one end of the casing 14 of the incubator and in communication at its upper and lower ends respectively with chambers 15 and 16 located respectively above and below the plane of the tray 17 upon which the eggs are adapted to rest and through which the air from one compartment may pass to the other by reason of a screen or openwork floor 18 forming the bottom of said tray. The heating unit being located in the chamber 11 of which the side walls are formed by depending portions or legs of the boiler constituting the equalizing or distributing unit, the heat generated by said heating unit is tempered in its passage to the interior of the egg chamber represented by the interior of the body of the casing and at the same time a degree of heat is stored in the equalizing or distributing unit, depending upon the temperature of the liquid contents of the boiler which serves to modify the temperature within the casing for a considerable time after the heating unit has been cut off or the operation thereof has been discontinued, there being a steady and practically uniform radiation of heat from the walls of the boiler which serves to permit only a very gradual reduction in the temperature in the casing when, the temperature having risen to a point necessitating the elimination of the heating unit, the action of the latter has been discontinued.

The energy necessary for actuating the heating unit of the type preferred and shown in the drawing, as indicated particularly in the diagram of Fig. 4 may be derived from any suitable source such as a domestic service line or battery indicated at 19 and including the elements of the heating unit and a circuit closer 20 having the terminals 21 and 22 of which the latter is carried by a lever 23 or similar movable support connected by a rod or link 24 with an arm 25 actuated by a thermostat 26, the latter being arranged in the casing at any suitable or preferred point with relation to the water. Obviously an expansion of the elements of the thermostat beyond a predetermined limit will serve to actuate the support 23 to break the circuit at the circuit closer or switch 20 whereas the reduction of the temperature within the egg chamber will have the effect of restoring the contact between the terminals 21 and 22, and the temperature at which the circuit should be broken may be adjusted by means of a screw 27 forming the connection between the support 23 and the rod or link 24 as shown clearly in Fig. 2.

Owing to the fact as above noted, that the equalizing or distributing member is interposed between the heating unit and the interior of the casing and serves as the means by which the heat generated by the heating unit is communicated to the circulating column of air in the casing, the discontinuance of the operation of the heating unit will not cause an immediate or abrupt reduction in the temperature within the casing, but on the other hand as the equalizing or distributing unit continues to radiate heat by reason of the storage therein of heat units, the reduction of temperature will be gradual, and hence an accurate adjustment of the connections between the thermostat and the circuit closer will result in such a control of the heating unit as to maintain a practically uniform temperature within the casing, such fluctuations as occur being so gradual as to be practically imperceptible.

What is claimed is:

1. A heating apparatus for the purpose indicated having a heating unit and a heat equalizing and distributing member defining a chamber housing the heating unit and having fluid contained walls interposed between said unit and the space to be heated.

2. A heating apparatus for the purpose indicated comprising a thermostatically controlled heating unit, and a heat equalizing and distributing member consisting of a liquid containing boiler of which the side walls are formed by depending portions defining a chamber in which the heating unit is housed.

3. A device of the class described having upper and lower chambers connected by an upright circulating passage, and a heating apparatus having a thermostatically controlled heating unit and a heat equalizing and distributing member consisting of a boiler located in said circulating passage and inclosing a heat chamber within which said heating unit is located.

4. The combination with an incubator or the like having an interior heat circulating passage, of a heat equalizing and distributing member consisting of a boiler arranged in said passage and provided with an interior inclosed heat chamber, an electric heating unit disposed in said heat chamber and in circuit with a source of supply and a circuit closer, a thermostat arranged in said casing, and connections between the thermostat and the circuit closer and including an adjusting device for regulating the relation between the thermostat and the movable element of the circuit closer.

In testimony whereof he affixes his signature.

JAMES L. NUNGESTER.